United States Patent [19]

Fredrick

[11] Patent Number: 5,547,259
[45] Date of Patent: Aug. 20, 1996

[54] MODULAR AUTOMOTIVE SEAT FRAME

[75] Inventor: Mark D. Fredrick, Corunna, Mich.

[73] Assignee: Mitchell Corporation of Owosso, Inc., Owosso, Mich.

[21] Appl. No.: 240,853

[22] Filed: May 9, 1994

[51] Int. Cl.⁶ .................................................. A47C 7/02
[52] U.S. Cl. .......................... 297/452.18; 297/452.4; 297/483; 297/475; 297/284.1
[58] Field of Search ......................... 297/452.18, 452.2, 297/452.4, 284.1, 483, 396, 475, 284.4, 452.3; 280/801 A, 808

[56] References Cited

U.S. PATENT DOCUMENTS

| | | |
|---|---|---|
| Re. 34,501 | 9/1992 | Deegener et al. . |
| 2,534,009 | 12/1950 | Freasier et al. ................ 297/452.40 X |
| 2,680,476 | 6/1954 | Saffell . |
| 3,178,225 | 4/1965 | Bayer . |
| 3,357,736 | 12/1967 | McCarthy . |
| 3,431,019 | 3/1969 | Lewis et al. . |
| 3,620,569 | 11/1971 | Mathis . |
| 3,740,091 | 6/1973 | Krejci, III . |
| 3,759,572 | 9/1973 | Koepke ............................. 297/452.40 |
| 3,761,127 | 9/1973 | Giese et al. ........................ 297/475 X |
| 3,822,915 | 7/1974 | Colucci . |
| 3,832,002 | 8/1974 | Eggert, Jr. et al. . |
| 3,877,748 | 4/1975 | Eggert . |
| 3,887,233 | 6/1975 | Garavaglia et al. . |
| 4,040,660 | 8/1977 | Barecki . |
| 4,090,735 | 5/1978 | Czernakowski . |
| 4,199,189 | 4/1980 | Neumann . |
| 4,364,607 | 12/1982 | Tamburini . |
| 4,431,233 | 2/1984 | Ernst . |
| 4,610,480 | 9/1986 | Yamada et al. . |
| 4,626,028 | 12/1986 | Hatsutta et al. ................. 297/284.1 X |
| 4,652,053 | 3/1987 | Mikami . |
| 4,738,485 | 4/1988 | Rumpf . |
| 4,801,156 | 1/1989 | Escaravage .......................... 297/483 X |
| 4,889,389 | 12/1989 | White . |
| 5,015,010 | 5/1991 | Homeier et al. . |
| 5,020,856 | 6/1991 | George . |
| 5,074,591 | 12/1991 | Yano et al. ........................ 297/483 X |
| 5,123,673 | 6/1992 | Tame . |
| 5,123,706 | 6/1992 | Granzow et al. .................. 297/452.18 |
| 5,217,278 | 6/1993 | Harrison et al. ................ 297/284.4 X |
| 5,253,924 | 10/1993 | Glance . |
| 5,284,381 | 2/1994 | Aoki et al. ......................... 297/452.18 |
| 5,286,091 | 2/1994 | Busch . |

*Primary Examiner*—Laurie K. Cranmer
*Attorney, Agent, or Firm*—Warner Norcross & Judd

[57] ABSTRACT

A modular automotive seat frame enabling a variety of seat frames to be fabricated of modular components. The seat back frame includes a pair of side supports each including a cross member which nestingly interfit with one another. The amount of nesting is varied to vary the width of the seat back. An upper member is secured between the side supports and is adapted to support a headrest. In an enhanced embodiment, the seat is an all-belts-to-seat design. A belt retractor is mounted to the nested cross members of the side supports and a shoulder belt terminal is mounted on the upper member of the seat back frame. The terminal permits the height of the shoulder belt loop to be adjusted for comfort and safety.

29 Claims, 3 Drawing Sheets

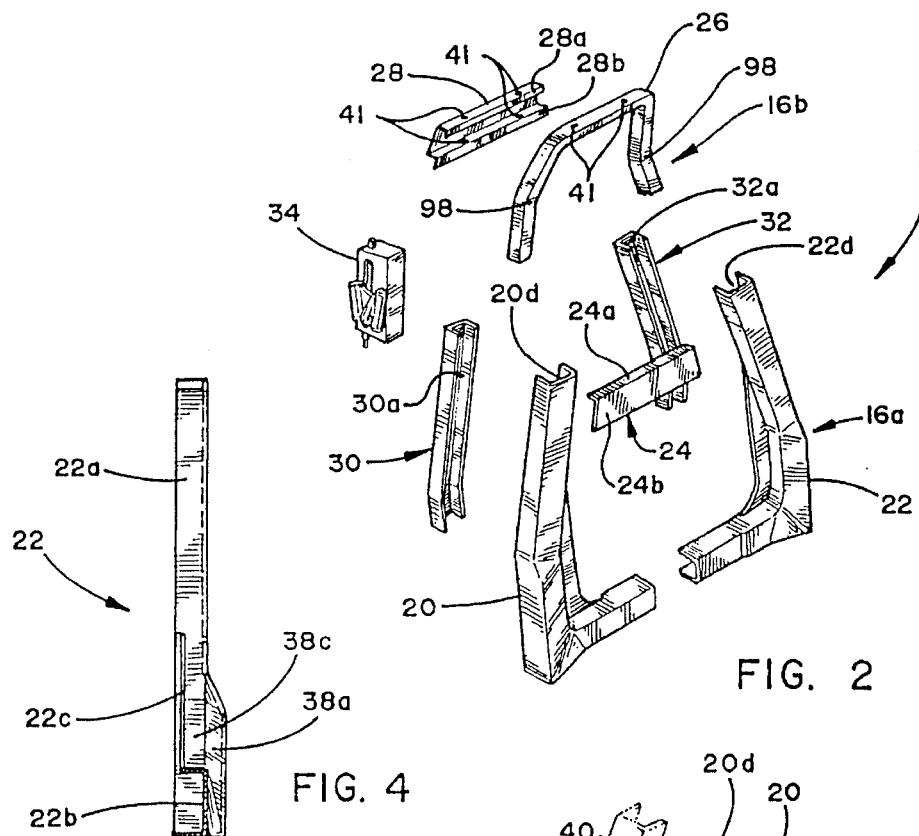
FIG. 2
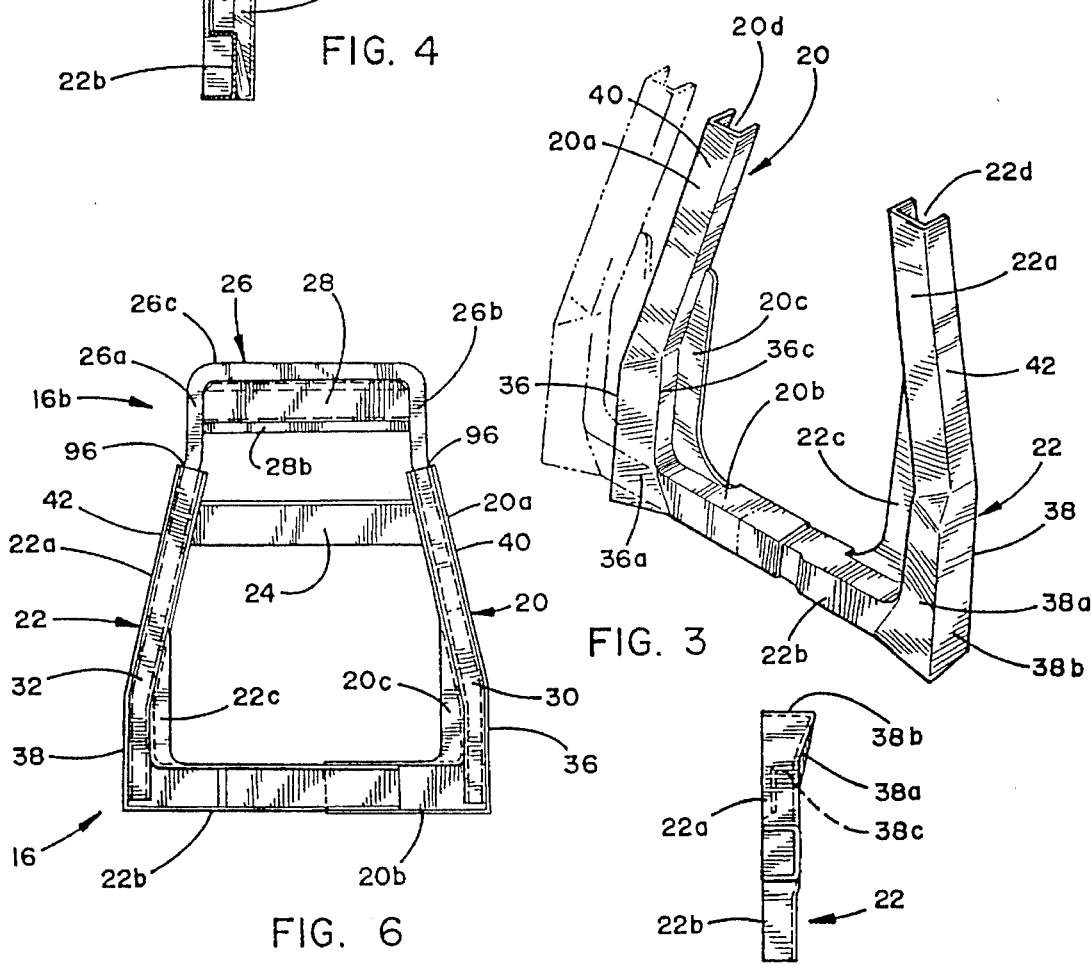
FIG. 4
FIG. 3
FIG. 6
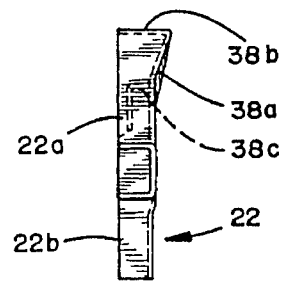
FIG. 5

MODULAR AUTOMOTIVE SEAT FRAME

BACKGROUND OF THE INVENTION

The present invention relates to seat frames for automobiles, and more particularly to such a frame having an optional "all-belts-to-seat" design.

The physical characteristics of automobile seating and safety belt assemblies are in large part regulated by a set of national safety standards designed to protect a passenger from injury during collision. When designing seating and restraint systems, reducing cost and weight also are desirable. In addition, each line of seats must be designed to conform to the size and shape requirements of the particular vehicle. These variations in size and shape typically require a separate frame design for each seat, which is expensive and time-consuming.

There is a growing trend to provide automotive seating with integral safety belts. This type of design, commonly referred to as all-belts-to-seat, eliminates the need for separate passenger restraint systems. Instead, a complete seat and safety belt assembly meeting national safety standards can be installed together.

One all-belts-to-seat design is disclosed in U.S. Pat. No. 5,253,924, issued Oct. 19, 1993, to Glance. The Glance seat incorporates a reinforcing beam added to the seat back frame to support the safety belt shoulder harness above the passenger's shoulder and to transfer crash forces to the frame of the seat. Reinforcing beams add undesired weight to the seat assembly and also create an unattractive asymmetric seat profile.

Another all-belts-to-seat design is disclosed in U.S. Pat. No. 5,123,673, issued Jun. 23, 1992, to Tame. The belt retractors are mounted to an upper portion of the seat back frame. Such a construction requires an extremely strong seat back frame that can bear the crash forces imparted by a loaded passenger restraint system.

In addition, current all-belts-to-seat designs include a single-height safety belt terminal, which can not be adjusted to match the height of the occupant. This reduces the effectiveness of the safety belt and may even pose a safety hazard. For example, a terminal location that is too low may result in potentially injurious downward force being applied to a passenger's shoulder during collision. While a terminal location that is too high may be uncomfortable or result in unwanted play in the belt.

SUMMARY OF THE INVENTION

The aforementioned problems are overcome by the present invention wherein a relatively small number of modular components are used to fabricate a wide variety of seat frames for a wide variety of seat shapes, sizes, and aesthetics.

As disclosed, the invention includes a seat back frame having a lower assembly formed from two L-shaped side supports having nesting cross members, an upper member adapted to receive a headrest assembly, and a lumbar-support cross member extending between the side supports. The nesting side supports are fixedly intersecured to define the width of the frame. The upper member and the cross member are selected depending on this width and are fixedly secured to the side supports. Consequently, the basic modular seat back frame has a simple yet effective construction.

The lower seat assembly also can be fabricated of modular components to support seat cushions having a variety of sizes and shapes. This assembly incorporates either a pair of nesting "C" shaped members or a set a four "L" shaped members.

In an alternative and enhanced embodiment, the modular seat frame is an all-belts-to-seat design. The retractor for the shoulder belt is mounted directly to the nested side members. An adjustable-height, shoulder belt terminal assembly is mounted to, or incorporated into, the upper member. The seat back frame distributes crash forces in a generally vertical compression pattern throughout the entire seat back frame. Optionally, reinforcing members are installed in the seat back frame to provide additional strength.

Preferably, the modular side supports are stamped to provide large, flat surfaces to receive a wide variety of motors and linkages for accessories such as seat adjusters, lumbar support mechanisms, and belt retractors without the need for custom bracketing.

The present invention allows the manufacture of a wide variety of size and shape seats from modular parts without the need for redesign or retooling with each frame. In addition, the present invention provides an all-belts-to-seat design that allows nearly symmetric aesthetics of the seating. Further, the adjustable-height shoulder belt terminal assembly allows the on-seat shoulder belt to be adjusted to the height of the seat occupant.

These and other objects, advantages, and features of the present invention will be more fully understood and appreciated by reference to the detailed description of the preferred embodiment and the drawings.

BRIEF DESCRIPTION OF THE DRAWINGS

FIG. 2 is a perspective, exploded view of the seat back frame;

FIG. 3 is a perspective view of one of the modular side support;

FIG. 4 is a side elevational view of the modular side support;

FIG. 5 is a top plan view of the modular side support;

FIG. 6 is a back elevational view of the seat back frame;

FIG. 7 is a perspective view of an alternative modular seat frame;

DETAILED DESCRIPTION OF THE PREFERRED EMBODIMENT

Figure 1:
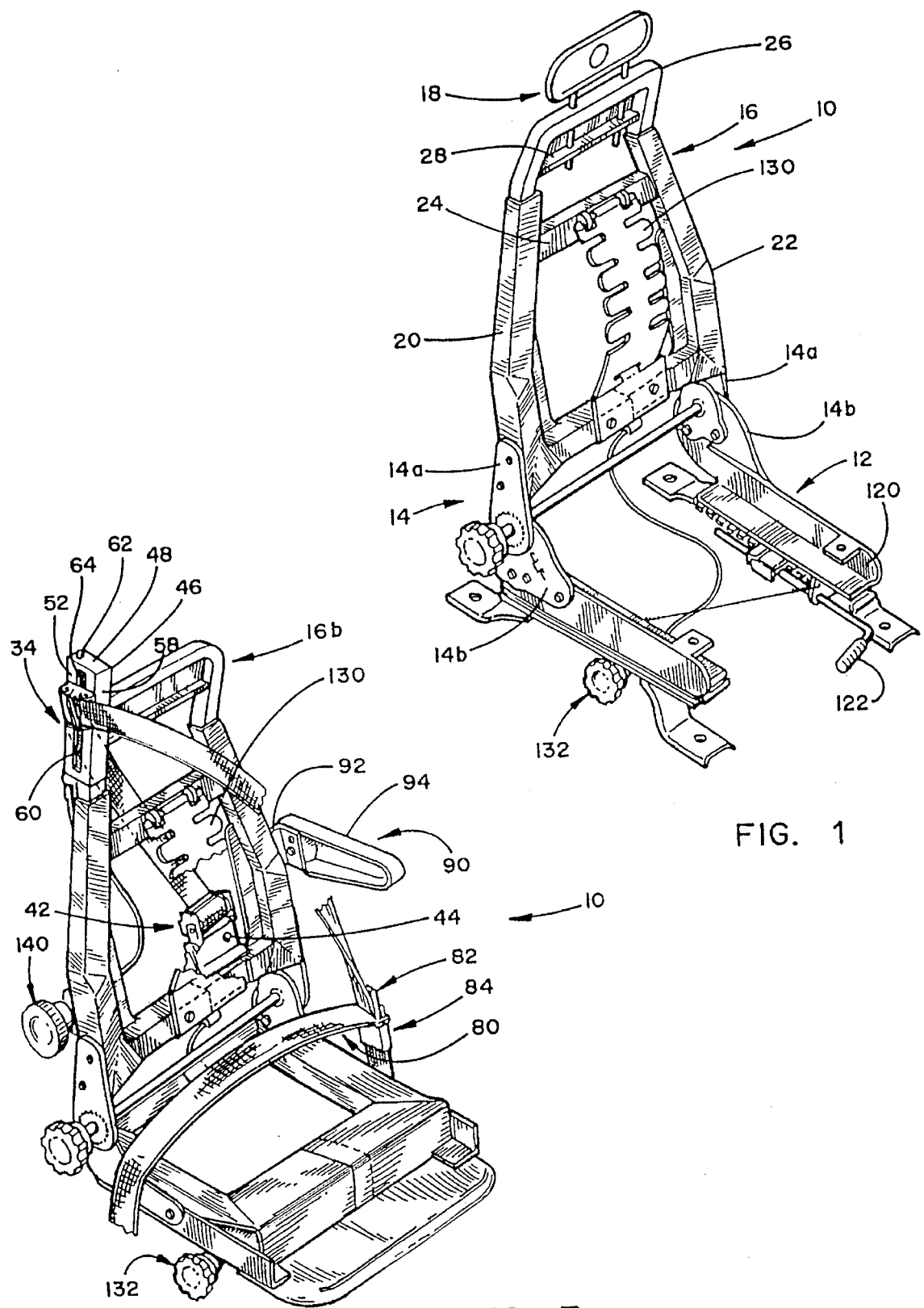
FIG. 1 is a perspective view of the modular seat frame of the present invention.

By way of disclosure and not by way of limitation, an automobile seat frame constructed in accordance with a preferred embodiment of the present invention is shown in FIG. 1 and generally designated 10. The seat frame 10 is mounted on a conventional seat track 120 having a conventional adjuster assembly 122, and includes a lower seat assembly 12, a recliner assembly 14, a seat back frame 16, and a headrest assembly 18. For purposes of this disclosure, the terms forward, rearward, upward, and downward will be used to denote typical directions from the reference point of an individual positioned within the seat. In addition, the term inward will be used to refer to the direction toward the center of the area enclosed by the seat back frame 16, and the term outward will be used to refer to the opposite direction.

The recliner assembly 14 includes upper and lower mounting brackets 14a and 14b that are secured to the lower seat assembly 12 and seat back frame 16, respectively, by conventional means, such as bolts and/or welding. In the embodiment illustrated in FIG. 1, the lower seat assembly 12 and recliner assembly 14 are conventional elements well known to those of ordinary skill in the art. One suitable lower seat assembly is that manufactured and sold by Delta U.S.A. of Monroe, Mich. as a manual adjuster; and one suitable recliner mechanism is that manufactured and sold by Atwood Automotive of Battle Creek, Mich. as a manual recliner. While the recliner assembly 14 of FIG. 1 is manually operated, a powered recliner assembly may be substituted therefor.

As perhaps best illustrated in FIG. 2, the seat back frame 16 includes a lower assembly 16a, having a pair of side supports 20 and 22, and a lumbar support cross member 24. The seat back frame 16 also includes an upper assembly 16b having a headrest tube 26 and a headrest bracket 28. The seat back frame 16 further includes a pair of reinforcing or high load members 30 and 32 and an adjustable-height shoulder belt terminal assembly 34.

The two side supports 20 and 22 are near mirror images of each other. The side supports are formed by stamping. The weight and strength of the side supports can be varied relatively easily, for example, by altering the gauge of the metal. Each side support 20 and 22 is an elongated, somewhat "L" shaped element that preferably has a generally "U" shaped cross section. This cross sectional profile creates channels 20d and 22d in the rear of each side support 20 and 22 that receive the headrest tube 26 and reinforcing members 30 and 32 as will be described in greater detail below. As a further result of this cross sectional profile, the side supports 20 and 22 have large, flat walls that function as mounting surfaces for a wide variety of optional elements such as a lumbar support assembly, a belt retractor, seat adjustment motors, and other seating options.

Referring now to FIGS. 3–5, the side supports 20 and 22 each include an upright member 20a and 22a, a cross member 20b and 22b, and a flange portion 20c and 22c. Cross member 22b is dimensioned to slidably nest with cross member 20b. By varying the amount of nesting, or the amount of overlap, between the two cross members 20b and 22b, the width of the seat back frame 16 may be varied. FIG. 3 illustrates side supports 20 and 22 nested at an increased width in phantom lines. The nested side supports 20 and 22 are fixedly secured to one another, for example by welding or bolting. A first portion 36 and 38 of each upright member 20a and 22a extends substantially normal to the associated cross member 20b and 22b, thereby providing a flat mounting surface for securing the seat back frame 16 to the recliner assembly mounting bracket 14a. A second portion 40 and 42 of each upright member 20a and 22a extends inwardly at an angle that is acute to the associated cross member 20b and 22b, thereby providing a seat back frame that narrows toward its upper extreme. In a preferred embodiment, each first portion 36 and 38 is approximately 6 inches in length, the second portion is approximately 11.5 inches in length, and the angle of intersection between the two portions is approximately 13 degrees, 30 minutes. However, it should be readily apparent that the precise length of each portion 36, 38, 40, and 42, as well as the angle of intersection, may be varied as necessary to provide the desired seat back profile.

The first portion 36 and 38 of each upright member further includes complex front 36a and 38a and outer 36b and 38b walls designed to provide controlled collapse of the seat back frame during collision. As perhaps best illustrated in FIGS. 4 and 5, the outer walls 36b and 38b are somewhat wider than the inner wall 36c and 38c, thereby resulting in slanted front walls 36a and 38a. The slanted front walls 36a and 38a do not lie normal to the direction of typical crash forces and therefore are not likely to buckle during a typical front end collision. In addition, the bends formed between the slanted front walls 36a and 38a and the associated cross members 20b and 22b are formed at an angle to the plane defined by the outer walls 36b and 38b. This disposition reduces the likelihood that either of the bends will fold during a collision. As a result of this complex profile, controlled collapse of the seat back frame is designed to occur along bends 36d and 38d which are defined along a plane normal to typical crash forces.

Referring now to FIG. 2, the lower member also includes a lumbar support cross member 24 that extends between the two side supports 20 and 22 to provide a mounting surface and strengthen the seat back frame. In cross section, lumbar support cross member 24 is generally "L" shaped, thereby providing a pair of perpendicular mounting surfaces 24a and 24b. Cross member 24 is fixedly secured to side supports 20 and 22, for example, by welding or bolting.

As perhaps best illustrated in FIGS. 2 and 6, each side support also includes a pair of flanges 20c and 22c that provide additional strength to the seat back frame. The flanges are stamped as an integral part of each side support. However, the flanges may alternatively be prefabricated and welded into place along the side supports.

With reference to FIGS. 1, 2, and 6, the upper member 16b generally includes a headrest tube or member 26 and a headrest bracket 28. The headrest tube 26 is generally "U" shaped and is manufactured from a length of conventional tubing. The headrest tube 26 includes a cross member 26c extending between a pair of legs 26a and 26b. The length of the cross member 26c will vary from seat to seat as necessary to provide a seat back frame 16 of the desired width. The legs 26a and 26b extend away from one another to allow them to fit within channels 20d and 22d of the side supports. In a preferred embodiment, the outward bend 96 is approximately 13 degrees, 30 minutes. However, the precise angle of bend 96 will vary as necessary to provide the desired profile. The legs 26a and 26b also include a forward bend 98 such that a portion of the upper member 16b defines a plane extending at an angle to the plane defined by the lower member 16a. In a preferred embodiment, the angle of bend 98 is approximately 10 degrees. Again, bend 98 may be adjusted to provide the desired profile. The headrest tube 26 is preferably formed using conventional tube bending technology, thereby allowing the production of various size and shape tubes 26 without expensive retooling.

The headrest bracket 28 is welded to the headrest tube 26 as illustrated in FIGS. 1 and 6. In cross section, the headrest bracket 28 is preferably a generally "C" shaped element having upper and lower flanges 28a and 28b that extend downward to give the bracket additional strength. A pair of mounting holes 41 are formed through the headrest tube 26 and bracket 28 to facilitate the installation of a conventional headrest assembly. The bracket 28 and mounting hole 41 configuration may be varied as necessary to provide the appropriate seating for a variety of headrest assemblies. The upper member 16b is fixedly secured to the lower member 16a, for example, by welding or bolting.

Referring now to FIG. 7, an optional arm rest assembly 90 may be mounted to the seat back frame 16 along the outer surface of the lower member 16a. The arm rest assembly 90 includes a mounting bracket 92 and an arm rest 94 that pivots between a storage position (not shown) wherein the arm rest 94 is in alignment with the plane defined by the seat back frame 16, and an operational position (illustrated in FIG. 7) wherein the arm rest 94 extends substantially perpendicularly from the plane defined by the seat back frame 16.

As illustrated in FIGS. 1 and 7, the seat back frame 16 may also include an optional lumbar support 130. The lumbar support 130 is a conventional element available from a variety of well known suppliers. The lumbar support 130 may be provided with a conventional manual 132 or powered (not shown) control assembly.

Alternative Embodiments

In an alternative embodiment, the seat frame 10 includes an all-belts-to-seat design. In this embodiment, the modular seat frame 10 is fit with a safety belt retractor 42 and an adjustable-height shoulder belt terminal assembly 34. In addition, the strength of seat back frame 16 may bolstered by the installation of reinforcing members 30 and 32.

As perhaps best illustrated in FIG. 7, the belt retractor 42 is mounted to the upper surface of cross member 20b by a single bracket 44 having an "L" shaped cross section. The bracket 44 is fixedly secured to cross member 20b, for example, by welding. The retractor 42 is, in turn, bolted or welded to bracket 44. The belt retractor 42 is a conventional assembly that is commercially available from a variety of well known suppliers.

The adjustable-height shoulder belt terminal assembly 34 is designed for modular assembly to the outer surface of the upper member 16b, preferably by welding. Alternatively, the assembly may be structurally incorporated into the upper member 16b.

The assembly 34 generally includes a housing 46 having top 48, bottom 50, front 52, back 54, and side walls 56 and 58. The front wall 52 includes a vertical slot 60. In addition, the top 48 and bottom 50 walls each include a circular opening 62. A jack screw 64 extends through the housing 46 and is rotatably fitted within the openings 62. The portion of the jack screw 64 enclosed within the housing 46 is threaded. A pair of nuts 66 are seated at opposite ends of the threaded portion 64a to retain the jack screw 64 within the housing 46.

Figure 9:
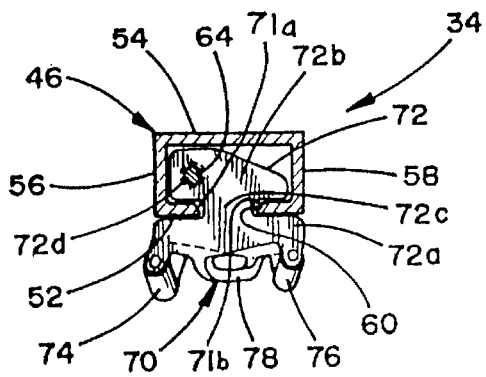
FIG. 9 is a sectional view of the height-adjustable shoulder belt terminal assembly taken along line IX—IX in FIG. 8.
Figure 8:
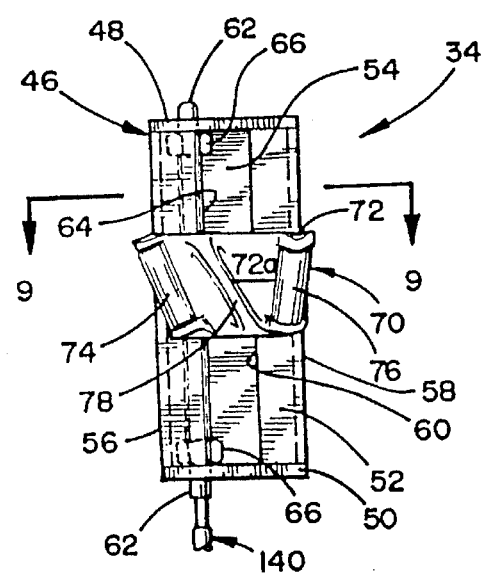
FIG. 8 is a side elevational view of the height-adjustable shoulder belt terminal assembly.

Referring now to FIGS. 7–9, the shoulder belt terminal 70 includes a generally "H" shaped (in cross section) block member 72, a pair of belt rollers 74 and 76, and a belt loop 78. As perhaps best illustrated in FIG. 9, block member 72 is mounted for vertical movement within slot 60. The block member 72 includes a pair of outer members 72a and 72b that are interconnected by a cross member 72c that extends through slot 60. The cross member 72c and outer members 72a and 72b define a pair of oppositely opening channels 71a–b adapted to interfit with front wall 52 (See FIG. 9). A threaded bore 72d extends through the block member 72 and is threadedly engaged with jack screw 64. Consequently, rotational movement of the jack screw 64 causes shoulder belt terminal 70 to move vertically within slot 60.

The belt loop 78 and the rollers 74 and 76 are mounted to the front surface 72a of the block member. The rollers 74 and 76 are seated on a conventional bearing or bushing assembly and are skewed to feed a safety belt 80 from the belt retractor 42 through loop 78 and down in proper alignment over the passenger. A conventional manual 140 (See FIG. 7) or powered (not shown) cable drive system can be mounted to the jack screw 64 to allow easy control of the height of the shoulder belt terminal 70.

As shown in FIG. 7, the free end of the safety belt 80 is secured to the lower seat assembly 12 and includes a conventional buckle assembly 82. The buckle assembly 82 locks into engagement with a safety belt socket 84 that is also secured to the lower seat assembly 12.

In the all-belts-to-seat embodiment, reinforcing members 30 and 32 are preferably installed within the lower member 16b to strengthen the seat back frame 16. Reinforcing members 30 and 32 are mirror images of each other and have a generally "U" shaped cross section that defines a channel 30a and 32a. The reinforcing members 30 and 32 are stamped, brake formed, rolled, or bent to fit within channels 20d and 22d (See FIGS. 2 and 6). Preferably, the reinforcing members 30 and 32 are dimensioned so that the headrest tube 26 fits within channels 30a and 32a, as shown in FIG. 6.

The reinforcing members 30 and 32 may be customized to contribute to a desired crash pulse. It should be readily apparent that the reinforcing members 30 and 32 may be installed to give additional strength to seat back frame 16 regardless of whether or not the all-belts-to-seat design is used.

Figure 10:
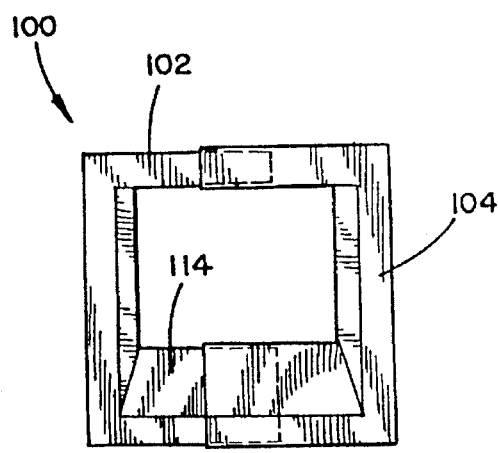
FIG. 10 is a top plan view of the modular seat cushion frame.
Figure 11:
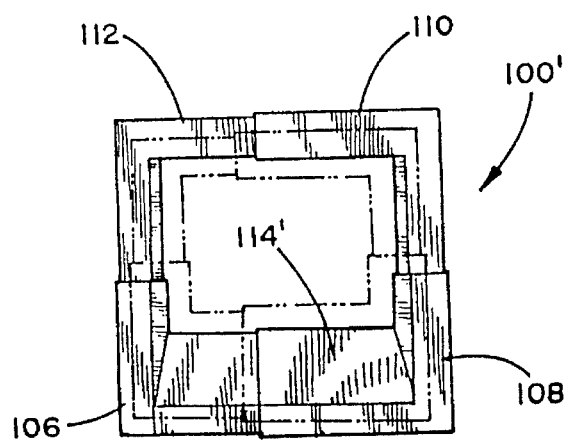
FIG. 11 is a top plan view of an alternative modular seat cushion frame.

In a second alternative embodiment, the seat frame 10 is provided with a high strength modular seat cushion frame 100 (See FIG. 7). The cushion frame 100 may be configured to allow width adjustment only (See FIG. 10) or both width and depth adjustment (See FIG. 11). The width-only adjustable frame 100 includes two "C" shaped members 102 and 104 that are nested with each other in a manner very similar to side supports 20 and 22. The fully adjustable frame 100', however, includes four "L" shaped members 106, 108, 100, and 112 that nest with each other to provide full adjustment of the seat frame. A frame of diminished width and depth is shown in FIG. 11 in phantom lines. The members of both frames 100 and 100' are fixedly secured to one another, for example, by welding or bolting. Both frames 100 and 100' also include a sloped wall 114 and 114' designed to prevent a passenger from "submarining" under the lap belt during a collision. As shown in the illustrations, the sloped wall 114 and 114' is preferably manufactured as an integral part of frame members 102, 104, 106, and 108.

When a seat track 120 and adjuster assembly 122 of sufficient strength are used, the seat cushion frame 100 and 100' may be replaced by an inexpensive molded seat pan (not shown).

Upon completion of assembly, the seat frame 10 is cushioned and upholstered as desired. In the all-belts-to-seat embodiment, the belt retractor 42 and adjustable-height shoulder belt assembly 34 are encased within the upholstery.

The above descriptions are those of preferred embodiments of the invention. Various alterations and changes can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A modular automotive seat back frame, comprising:

a first side support;

a second side support, each of said side supports include an upright member and a cross member, said cross members being dimensioned to slidably nest with each other;

adjustable mounting means for securing said first side support to said second side support at a desired spaced apart distance, said adjustable mounting means including said cross members;

a cross support extending between said side supports; and an upper member mounted to said side supports, said upper member including a headrest tube mounted to said side supports and a headrest bracket mounted to said headrest tube.

2. The seat back frame of claim 1, further comprising at least one high load member mounted to at least one of said side supports.

3. The seat back frame of claim 2, wherein said upright portion of side supports includes a portion contoured to provide controlled collapse of the seat back during collision.

4. A modular automotive seat back frame comprising:

a first side support;

a second side support;

adjustable mounting means for securing said first side support to said second side support at a desired spaced apart distance;

a cross support extending between said side supports;

an upper member mounted to said side supports; and an adjustable height shoulder belt terminal assembly.

5. A modular automotive seat, comprising:

a back frame having an adjustable width and including a first generally L-shaped side support having a horizontal leg and a vertical leg, a second generally L-shaped side support having a horizontal leg and a vertical leg, and an adjustable mounting means for intersecuring said first and second horizontal legs with said vertical legs at a desired spaced apart distance defining a back width;

a seat frame having a seat width independent of said back width; and attachment means for attaching said back frame to said seat frame.

6. The modular seat of claim 5, wherein said horizontal legs nest with each other; and wherein said adjustable mounting means includes means for intersecuring said nested horizontal legs.

7. The modular seat of claim 5, wherein said lower seat assembly includes a modular adjustable width seat pan, the width of said seat pan being adjustable independently of said seat back width.

8. A modular automotive seat comprising:

a seat back frame including a first side support;

a second side support, each of said side supports include an upright member and a cross member, said cross members being dimensioned to slidably nest with each other, and an adjustable mounting means for securing said first side support to said second side support at a desired spaced apart distance, said adjustable mounting means including said cross members;

a lower seat assembly;

an attachment means for attaching said seat back frame to said lower seat assembly; and an upper member having a headrest tube mounted to said side supports and a headrest bracket mounted to said headrest tube.

9. The modular seat of claim 8, further comprising at least one high load member mounted to at least one of said side supports.

10. The modular seat of claim 9, wherein said upright portion of said side supports includes a portion contoured to provide controlled collapse of the seat back during collision.

11. A modular automotive seat, comprising:

a seat back frame including
    a first side support,
    a second side support, and
    an adjustable mounting means for securing said first side support to said second side support at a desired spaced apart distance;

a lower seat assembly including a modular seat pan, said seat pan including two substantially "C" shaped members mounted together at a desired spaced apart distance, said "C" shaped members capable of nesting with one another at one of a range of spaced apart distances whereby seat pans of a variety of widths may be manufactured from a pair of "C" shaped members having a single set of dimensions; and an attachment means for attaching said seat back frame to said lower seat assembly.

12. A modular automotive seat, comprising:

a seat back frame including
    a first side support,
    a second side support, and
    an adjustable mounting means for securing said first side support to said second side support at a desired spaced apart distance;

a lower seat assembly including a modular seat pan, said seat pan includes a set of four substantially "L" shaped members mounted together at a desired spaced apart distance, said "L" shaped members capable of nesting with one another at one of a range of spaced apart distances whereby seat pans of a variety of widths and depths may be manufactured from a set of four "L" shaped members having a single set of dimensions; and an attachment means for attaching said seat back frame to said lower seat assembly.

13. An automotive seat frame comprising:

a pair of lower frame members each having an upper portion and a lower portion, said lower portions telescopically interfitted with one another, whereby the relative position of said lower frame members can be altered by altering the degree of telescoping;

means for fixedly intersecuring said lower portions;

an upper frame member extending between said upper portions;

means for fixedly intersecuring said upper frame member with both of said upper portions;

a seat belt retractor secured to at least one of said lower portions;

a seat belt terminal above said seat belt retractor; and a seat belt extending up from said retractor and partially supported by said terminal.

14. A seat frame as defined in claim 13, wherein both of said lower frame members are metal stampings.

15. A seat belt terminal for an automotive all-belts-to-seat frame comprising:
 a housing including at least one wall defining a slot;
 a block mounted within said slot for longitudinal movement there along, said block defining a pair of opposed channels interfitting with said wall to mechanically interlock said block with said wall, said block including means for supporting a seat belt; and
 mechanical adjustment means supported by said housing and engaging said block for adjusting the location of said block within said slot.

16. A seat belt terminal as defined in claim 15, wherein:
 said housing includes two of said walls opposite one another; and
 said block defines two of said block slots each interfitting with one of said walls.

17. An adjustable-height shoulder belt terminal assembly, comprising:
 a housing having a vertical slot;
 a shaft extending parallel to said slot; and
 a terminal mounted for vertical movement along said shaft, said terminal including a substantially "H" shaped block having a pair of outer portions connected to one another by a cross portion, said cross portion extending through said slot and said outer portions being on opposite side of said slot to trap said terminal within said housing.

18. The shoulder belt terminal assembly of claim 17, wherein said shaft is threaded and said terminal includes a threaded bore extending vertically therethrough, whereby rotational movement of said shaft causes said terminal to move vertically along said shaft.

19. The shoulder belt terminal assembly of claim 18, wherein said terminal includes a safety belt loop and a roller assembly.

20. An automobile seat frame having an all-belts-to-seat design, comprising:
 a seat back frame having a pair of upright side supports interconnected by a cross member extending between said upright side supports;
 a shoulder belt terminal mounted to one of said side supports;
 a safety belt retractor mounted to said cross member between said side supports;
 a safety belt extending from said retractor through said terminal whereby crash forces resulting from a collision are distributed in a compression pattern through the seat back frame.

21. The automobile seat of claim 20, wherein said upright side supports each have a lower portion that extends normal to said cross member and an upper portion that bends inwardly at an angle acute to said cross member.

22. A seat frame kit for assembling an automobile seat having a desired profile, comprising:
 a back frame having first and second side supports capable of being interconnected at one of a range of spaced apart distances defining a back width;
 an upper member capable of being mounted between said first and said second side supports;
 a seat frame having a seat width independent of said back width; and
 attachment means for intersecuring said back frame and said seat frame.

23. The seat frame kit of claim 22, further comprising:
 a lumbar support cross members adapted to mount between said side supports.

24. The seat frame kit of claim 23 wherein said seat frame includes first and second seat pan members capable of being interconnected at one of a range of spaced apart distances.

25. The seat frame kit of claim 24, further comprising:
 an adjustable-height shoulder belt terminal assembly capable of mounting to said upper member.

26. The seat frame kit of claim 25, further comprising:
 first and second high load members, each of said high load members being uniquely dimensioned and capable of mounting to at least one of said first and second pairs of side supports.

27. An automotive seat back frame comprising:
 a pair of L-shaped lower members, each including a generally vertical side arm and a generally horizontal connecting arm, said connecting arms telescopically receiving one another, whereby the distance between said side arms can be varied by varying the degree of telescoping between said connecting arms;
 securing means for fixedly intersecuring said connecting arms;
 a nonextensible upper member extending between said side arms; and
 second securing means for fixedly securing said upper member to both of said side arms.

28. A seat back frame as defined in claim 27, further comprising a pair of reinforcing members, each located within one of said side arms, said upper member also being secured to at least one of said reinforcing members.

29. An automotive seat back frame comprising:
 a pair of L-shaped lower members, each including a generally vertical side arm and a generally horizontal connecting arm, said connecting arms telescopically receiving one another, whereby the distance between said side arms can be varied by varying the degree of telescoping between said connecting arms;
 securing means for fixedly intersecuring said connecting arms;
 an upper member extending between said side arms;
 second securing means for fixedly securing said upper member to both of said side arms;
 a belt retractor;
 third securing means for securing said belt retractor to said intersecured connecting arms; and
 a belt terminal secured to said upper member.

* * * * *